UNITED STATES PATENT OFFICE.

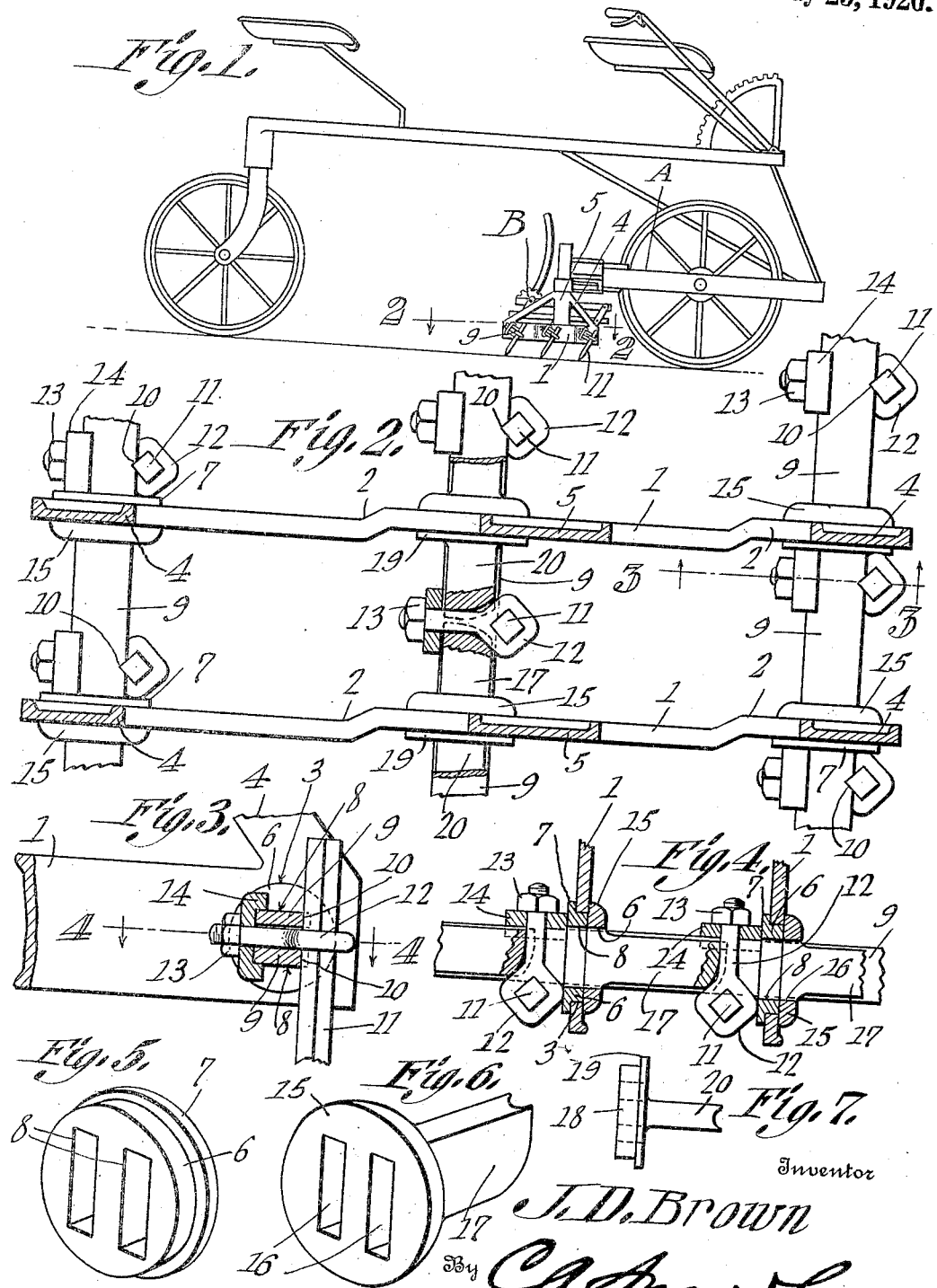

JOHN D. BROWN, OF LAS ANIMAS, COLORADO.

HARROW.

1,341,539. Specification of Letters Patent. Patented May 25, 1920.

Application filed December 5, 1919. Serial No. 342,753.

*To all whom it may concern:*

Be it known that I, JOHN D. BROWN, a citizen of the United States, residing at Las Animas, in the county of Bent and State of Colorado, have invented a new and useful Harrow, of which the following is a specification.

This invention relates to harrows and is designed more especially as an improvement upon the structure disclosed in my co-pending application filed July 12, 1919, Serial No. 310,380.

One of the objects of the invention is to provide means whereby the angularly adjustable bars to which the teeth of the harrow are connected can be made up of separate metal strips, thus to materially reduce the cost of manufacture as compared with a structure requiring the use of channeled strips.

With the foregoing and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 1 is a side elevation of a riding harrow having the present improvements combined therewith.

Fig. 2 is an enlarged plan view partly in section of a portion of the improved harrow, said section being taken on the line 2—2, Fig. 1.

Fig. 3 is a section on line 3—3, Fig. 2.

Fig. 4 is a section on line 4—4, Fig. 3.

Fig. 5 is a perspective view of one of the bar engaging disks.

Fig. 6 is a detail view of another form of bar engaging disk with a spacer combined therewith.

Fig. 7 is a plan view of another form of disk and spacer.

Referring to the figures by characters of reference 1 designates a bar which can have its end portions offset in opposite directions respectively as indicated at 2 and formed within an intermediate portion of this bar and in each offset portion thereof is a circular opening 3. Each of the bars of the harrow is provided with upwardly converging braces 4 having an integral standard 5 adapted to be connected in any manner desired to the main or riding portion of the harrow indicated generally at A in Fig. 1. The bars 1 can be placed at any desired distances apart and the openings 3 therein alined. In each of these openings a disk 6 is mounted for rotation, said disk having an annular flange 7 for preventing it from moving through the opening in one direction. Said disks are provided with spaced parallel slots 8 and extending through the slots are parallel metal strips 9 forming the tooth carrying members of the harrow. These strips are provided wherever desired with notches 10 adapted to receive the corner portions of harrow teeth 11 and said teeth are held clamped in the notches by eye bolts 12 which extend between the strips 9 and are held in place by nuts 13 engaging yokes 14 which straddle the strips as shown particularly in Fig. 3.

For the purpose of holding the strips 9 against longitudinal movement relative to the bars 1 certain of these yokes 14 bear laterally against the disk 6, as shown particularly in Fig. 4, this arrangement preventing the strips 9 from shifting in one direction. To prevent longitudinal movement of the strips 9 in the opposite direction disks 15 having parallel slots 16 therein for the reception of the strips 9 are placed against the small faces of the disks 6 so that portions of the bars 1 are received between the flanges 7 and the disks 15. Each of these disks 15 has a spacing finger 17 extending therefrom and adapted to project between the strips 9 and to extend up to and engage the bolts 12 as shown in Fig. 4. Under some conditions, where the tube is located at some distance from both of the bars 1 a disk 18 having a flange 19 therein and provided with a projecting finger 20 can be substituted for the disk 6 so that the bolt 12 will thus be held between said finger 20 and the finger 17, as shown particularly in Fig. 2.

It is to be understood that the bars 1 can be placed any desired distance apart and while the distance between them is very slight in the structure illustrated in Fig. 2 it is to be understood that such distance can be increased to such an extent as to allow several teeth to be placed between those bars 1 on which the standards 5 are arranged.

Obviously after the various parts of this harrow have been assembled in the manner described the tooth carrying members consisting of the strips 9 and the parts connected thereto can be rotated by any suitable means provided for that purpose and which have been indicated generally at B in Fig. 1 whereby the teeth 11 can be adjusted angularly.

What is claimed is:

1. A harrow including a bar having circular openings, a disk mounted for rotation in each of said openings, there being spaced slots within each disk, spaced strips extending through the respective slots, said strips being arranged in pairs, means for fastening harrow teeth to these strips, and spacing means interposed between the harrow tooth fastening means and the bars and extending between the strips.

2. In a harrow the combination with bars having openings therein and disks mounted for rotation in the openings and provided with spaced slots, strips extending through the slots and revoluble with the disks, harrow tooth engaging means extending between the strips, and spacing means between said strips and interposed between the harrow tooth engaging means and the disks.

3. In a harrow the combination with bars having openings therein, of disks mounted for rotation in the openings and bearing against one side of the bars, there being spaced slots in each disk, spaced strips extending through the slots and rotatable with the disks, harrow teeth fastening means connected to the strips and extending therebetween, and spacing means integral with the disks and extending between the strips and against the harrow tooth engaging means.

In testimony that I claim the foregoing as my own, I have hereto affixed my signature in the presence of two witnesses.

JOHN D. BROWN.

Witnesses:
MARTYN MYERS,
A. R. MARSHALL.